March 12, 1946.  F. H. GOODING ET AL  2,396,272
BUOYANT ELECTRIC CABLE
Filed Feb. 2, 1943  2 Sheets-Sheet 1
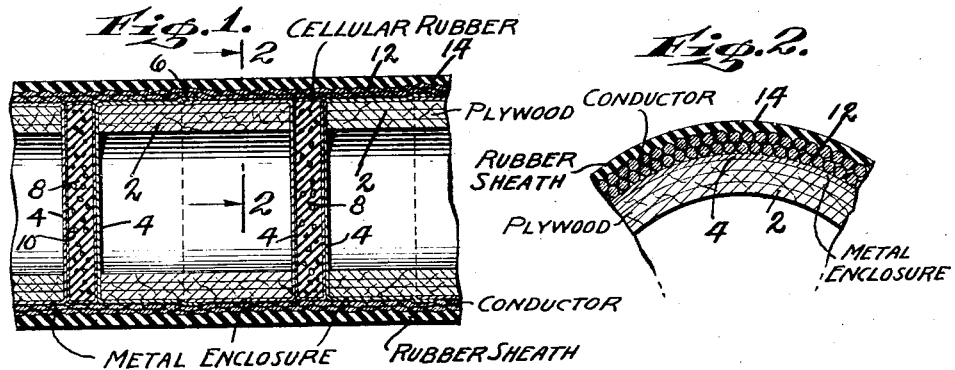
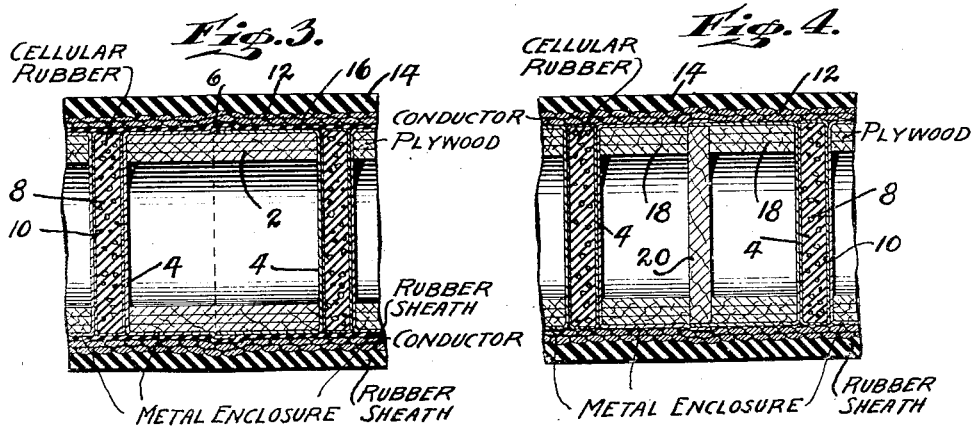
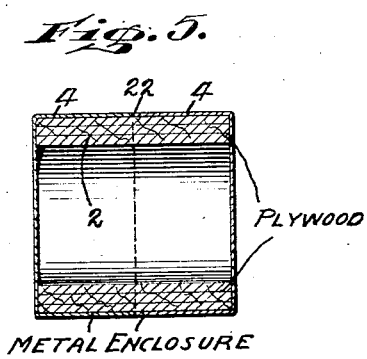
INVENTORS.
Francis H. Gooding.
Paul Louis Liph, Jr.
BY
James G. Bechtel.
ATTORNEY

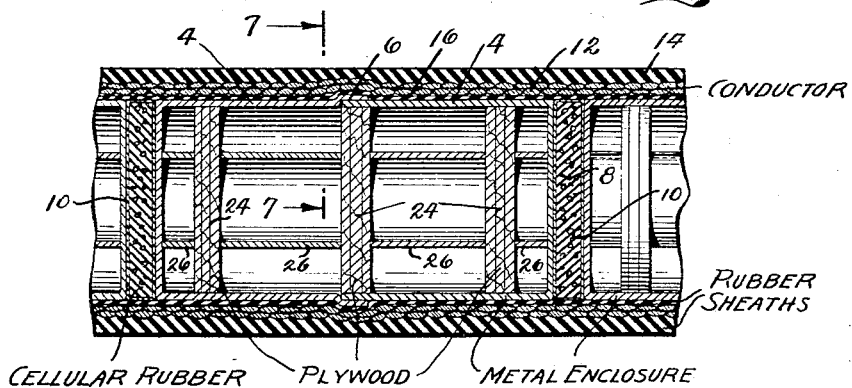
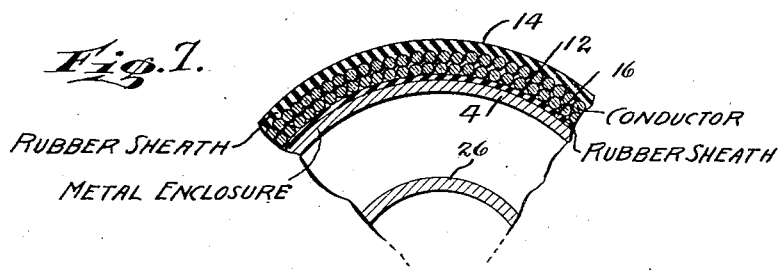
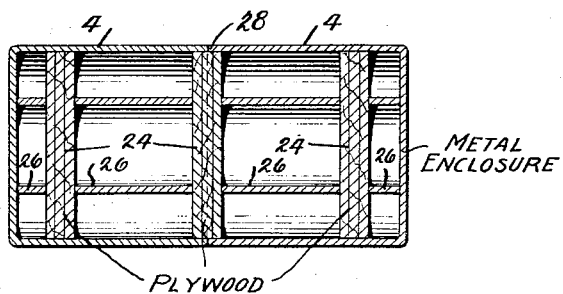

Patented Mar. 12, 1946

2,396,272

UNITED STATES PATENT OFFICE 2,396,272

BUOYANT ELECTRIC CABLE

Francis H. Gooding, Lodi, and Paul Louis Sipp, Jr., Ridgewood, N. J., assignors to The Okonite-Callender Cable Company, Incorporated, Paterson, N. J., a corporation of New Jersey Application February 2, 1943, Serial No. 474,420

13 Claims. (Cl. 174—110)

This invention relates to buoyant electric cables, and has for an object to provide a cable of new and improved construction and wherein the weight to volume ratio of the cable is such that the cable will float in a medium such as sea water.

More specifically the present invention provides a buoyant electric cable wherein new and improved center members or cells are employed which are rugged in construction, highly resistant to crushing forces and wherein the danger of water entering the centers or of the centers becoming waterlogged is reduced to a minimum.

In the accompanying drawings wherein several embodiments of the invention have been illustrated:

Fig. 1 is a fragmentary view in sectional elevation of one embodiment of the invention;

Fig. 2 is a cross section taken on the line 2—2 of Fig. 1;

Fig. 3 is a view similar to Fig. 1 of another embodiment of the invention;

Fig. 4 is a sectional elevational view of another embodiment of the invention showing a different center or core construction;

Fig. 5 is a sectional elevational view of still another form of center or core member;

Fig. 6 is a sectional elevational view of still another embodiment of the invention;

Fig. 7 is a section on the line 7—7 of Fig. 6; and

Fig. 8 is a sectional elevational view of still another center or cell member.

Referring to the drawings in detail and first of all to Figs. 1 and 2: It will be seen from the drawings that the cable of this embodiment of the invention comprises a plurality of hollow center or core members composed of plywood cylinders 2 each enclosed in a pair of metal cups 4 which fit closely over the cylinder and are welded, soldered or otherwise united with a sealed joint. In Fig. 1 we have shown the adjacent ends of the cups united with an overlap as seen at 6. The cups 4 are of light gauge metal which may be tin, copper or other suitable metal. It will be appreciated that such a center member or cell is watertight, not easily punctured and highly resistant to crushing. If desired the cells thus provided may be placed under an internal pressure of the order of 100 pounds per square inch gauge.

These cells are arranged along the center of the cable with flexible spacers 8 disposed between adjacent cells. These spacers have been shown as composed of cellular rubber in which case it is desirable to enclose each spacer in a gas-impervious skin 10. It is to be understood, however, that other types of spacer might be employed, if desired. For example, the spacers could be in the form of inflated rubber cylinders. The function of the spacers is to space the core cells from each other and promote and maintain the flexibility of the cable.

As illustrated in the drawings, the wires or strands composing the cable conductor 12 are stranded immediately about the assembly of cells and spacers, and an outer water-impervious, flexible, non-metallic sheath 14, rubber, for example, is applied about the conductor.

Fig. 3 shows another embodiment of the invention which is similar to that shown in Fig. 1, except that the center assembly—cells and spacers—are enclosed in a sheath 16 of rubber or rubber-like material and the conductor 12 stranded over this sheath, the whole being enclosed in the outer sheath 14. In this construction, when the cable is vulcanized, the spacers will bond to the sheath 16, so as to provide a watertight barrier at the periphery of each spacer against the passage of water along the interior of the cable in the event the cable is punctured.

Referring to the embodiment of the invention illustrated in Fig. 4: The cable here illustrated comprises core members or cells, each consisting of a pair of plywood cylinders 18 and an intermediate transverse wood or plywood disc or brace 20. The outside diameter of the disc 20 is the same as that of the cylinders 18 and the adjacent ends of the cylinders are sealed to this disc, to provide a cylindrical member having a transverse partition or brace. Surrounding this assembly are a pair of metal cups 4 the adjacent ends of which are lap welded, soldered or otherwise united as shown at 6 and as explained in connection with Fig. 1. The union between the ends of the cups 4 is at the disc 20, as shown in the drawings. The remainder of the cable construction is the same as that described in connection with Figs. 1, 2 and 3.

This cable, it will be appreciated, has all of the advantages of the structures of Figs. 1, 2 and 3, plus the additional strength provided by the disc 20.

In Fig. 5 a center member or cell has been illustrated which may be substituted for those already described. This cell is the same as those illustrated in Figs. 1 and 3, except that the adjacent ends of the metal cups 4 are butt welded at 22 or soldered or otherwise united instead of being united with an overlap.

Referring to Figs. 6 and 7: The center or core members of this embodiment of our invention are each composed of two metal cups 4 the open ends of which are overlapped as shown at 6 and welded, soldered or otherwise so secured to each other as to provide a hermetically sealed core member or cell. The metal of this cell may be steel, copper or other suitable material and it may be plated, enameled or otherwise treated to render it highly resistant to corrosion.

The resistance to crushing of these cells is materially increased by reinforcing or bracing with discs 24 of plywood or other suitable material extending transversely of the cell. These discs are a snug fit in the cup-shaped members but additionally may be cemented in place if desired. One of these discs, as shown in the drawings, is preferably so positioned as to lie directly beneath the joint or seam 6.

In addition to the discs 24 the interior of the cell is provided with longitudinally extending reinforcing tubes or braces 26. These braces may be solid or tubular and may be composed of plywood or other suitable material. As will be seen from the drawings they space the discs 24 from the cell ends and from each other. With such a construction, namely, an elongated cylindrical metal cell raced internally, both transversely and longitudinally, an extremely strong construction is provided. If desired the cells may be maintained internally under superatmospheric pressure, still further increasing their resistance to crushing.

The center or core cells extend lengthwise of the cable and intermediate adjacent cells are spacers 8. These spacers are preferably buoyant elastic members such as inflated rubber cylinders, or cellular rubber discs, the latter having been shown on the drawings. When employing cellular rubber each spacer is preferably provided with a gas impervious skin 10.

The assembly of cells and spacers may be enclosed in a flexible, rubber or rubber-like sheath 16, as illustrated, and the wires composing the cable conductor 12 stranded about this sheath. Over the cable conductor 12 is a non-metallic, flexible, water-impervious sheath 14 of rubber or rubber-like material.

The cable after assembly is subjected to vulcanization, and in this process the periphery of the spacers 8 and the sheath 16 become bonded to each other, which seals the cable against the passage of water along the interior of the same in the event the cable is punctured.

In Fig. 8 a further modified form of cell has been illustrated which is identical with that shown in Fig. 6 except that the open ends of the metal cups 4 abut each other, as shown at 28, instead of being overlapped, and are welded, soldered or otherwise secured to each other to provide a hermetic seal.

It will be understood that in all embodiments of our invention the weight to volume ratio of the cable is such as to enable the same to float in sea water.

It will be appreciated from all of the foregoing that this invention provides a buoyant cable construction which is very rugged and highly resistant to crushing. It will be appreciated, also, that the cells at the cable center are readily hermetically sealed, and that the likelihood of the cable becoming waterlogged is reduced to a minimum even should the cable be punctured at several places.

It is to be understood that changes may be made in the details of construction and arrangement of parts hereinabove described without departing from the spirit and scope of the invention.

What we claim is:

1. A buoyant electric cable, comprising in combination a center of a plurality of cells, each composed of a plywood cylinder enclosed in metal to provide a hermetically sealed cell, spacers of elastic material intermediate adjacent cells, a conductor stranded about the assembly of cells and spacers, and an enclosing non-metallic, flexible, water-impervious sheath, the weight to volume ratio of the cable being such as to enable the cable to float in a medium such as sea water.

2. A buoyant electric cable, comprising in combination a center of a plurality of cells, each composed of a plywood cylinder enclosed in metal to provide a hermetically sealed construction, spacers of elastic material intermediate adjacent cells, a rubber sheath enclosing said assembly of cells and spacers, a conductor stranded about said sheath, and an outer enclosing non-metallic, flexible, water-impervious sheath, the weight to volume ratio of the cable being such as to enable the cable to float in a medium such as sea water.

3. A buoyant electric cable, comprising in combination a center of a plurality of cells, each composed of a plywood cylinder enclosed in metal to provide a hermetically sealed construction, spacers of cellular rubber intermediate adjacent cells, a rubber sheath about said assembly, a conductor stranded about said sheath, and a rubber sheath about said conductor, the weight to volume ratio of the cable being such as to enable the cable to float in a medium such as sea water.

4. A buoyant electric cable, comprising in combination a center of a plurality of cells, each composed of a plywood cylinder, each enclosed in a pair of metal cups pushed over opposite ends of the plywood cylinder and having their adjacent edges welded to each other, spacers intermediate said cells, a conductor stranded about said cells and spacers, and an enclosing, non-metallic, water-impervious, flexible sheath, the weight to volume ratio of the cable being such as to enable the cable to float in water.

5. A buoyant electric cable, comprising in combination a center of a plurality of cells, each composed of a plywood cylinder, each enclosed in a pair of metal cups pushed over opposite ends of the plywood cylinder and having their adjacent edges welded to each other with an overlap, spacers intermediate said cells, a conductor stranded about said cells and spacers, and an enclosing non-metallic, water-impervious sheath, the weight to volume ratio of the cable being such as to render the cable buoyant in water.

6. A buoyant electric cable, comprising in combination a center of a plurality of cells, each composed of a plywood cylinder, each enclosed in a pair of metal cups pushed over opposite ends of the plywood cylinder and having their adjacent edges butt welded to each other, spacers intermediate said cells, a conductor stranded about said cells and spacers, and an enclosing non-metallic, water-impervious, flexible sheath, the weight to volume ratio of the cable being such as to enable the cable to float in water.

7. A buoyant electric cable, comprising in combination a center of a plurality of cells, each composed of a pair of plywood cylinders spaced by a disc extending transversely of the cylinders and sealed to them both, metal cups pushed over the outer ends of said cylinders and having their adjacent edges welded to each other at the periphery of said disc, spacers between adjacent cells, a conductor stranded about said cells and spacers, and an outer enclosing non-metallic, water-impervious sheath, the weight to volume ratio of the cable being such as to render the cable buoyant in water.

8. In a buoyant electric cable in which the weight to volume ratio is such as to enable the same to float in a medium such as sea water, the combination of a plurality of center cells of metal each internally braced, resilient spacers between adjacent cells, a cable conductor stranded about the assembly of cylindrical members and spacers, and an outer enclosing, non-metallic, flexible water-impervious sheath.

9. In a buoyant electric cable in which the weight to volume ratio is such as to enable the same to float in a medium such as sea water, the combination of a plurality of center cells of metal each internally braced, resilient spacers between adjacent cells, a water-impervious, non-metallic, flexible sheath about the assembly of cells and spacers, a cable conductor stranded about said spacers, and an outer enclosing, non-metallic, sheath, and an outer enclosing, non-metallic, flexible, water-impervious sheath.

10. In a buoyant electric cable in which the weight to volume ratio is such as to enable the same to float in a medium such as sea water, the combination of a plurality of hermetically sealed cylindrical metal members each braced internally and transversely by a plurality of wooden discs extending across each member, and longitudinally by braces positioned between adjacent discs and between the discs and the ends of the cylindrical member, spacers intermediate adjacent cylinders, a cable conductor stranded about the assembly of cylindrical members and spacers, and an outer enclosing non-metallic, flexible, water-impervious sheath.

11. In a buoyant electric cable in which the weight to volume ratio is such as to enable the cable to float in a medium such as sea water, the combination of a plurality of cells each comprising metal cups having their open ends secured to each other to provide a hermetic seal, plywood bracing for each of said cells, said bracing comprising a plurality of plywood discs extending crosswise of the cell, and tubular members between adjacent discs and between the discs and the ends of the cell, spacers intermediate adjacent cells, a conductor stranded about the assembly of cells and spacers, and an outer enclosing flexible non-metallic, water impervious sheath.

12. In a buoyant electric cable in which the weight to volume ratio is such as to enable the cable to float in a medium such as sea water, the combination of a plurality of cells each comprising metal cups having their open ends secured to each other with an overlap to provide a hermetic seal, plywood discs within each cell and extending transversely thereof, one of said discs lying directly beneath said overlap, tubes within each cell between adjacent discs and between the end discs and the ends of the cell, a conductor stranded about the cells and spacers, and an outer enclosing, flexible, non-metallic, water-impervious sheath.

13. In a buoyant electric cable in which the weight to volume ratio is such as to enable the cable to float in a medium such as sea water, the combination of a plurality of cells each comprising metal cups having their open ends abutting and secured to each other so as to provide a hermetically sealed joint, a plywood disc within each cell extending across the same immediately beneath the said joint, a disc at each side of the first mentioned discs, tubular members maintaining these last mentioned discs in spaced relation with respect to the first mentioned disc and with respect to the ends of the cell, spacers between adjacent cells, a cable conductor stranded about the assembly of cells and spacers, and an outer enclosing sheath of non-metallic, flexible, water-impervious material.

FRANCIS H. GOODING.
PAUL LOUIS SIPP, JR.